Figure 1:
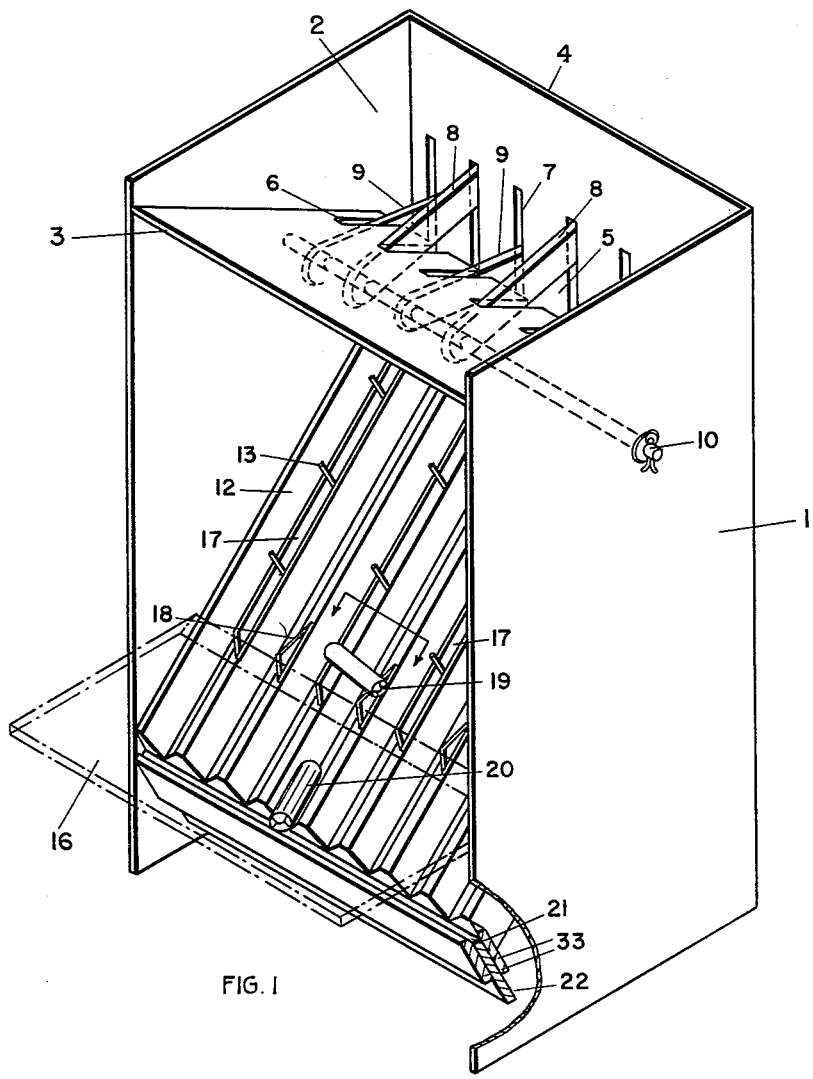

Aug. 9, 1955  J. B. SEED ET AL  2,714,832
ARTICLE SORTING AND DELIVERY MACHINE
Filed Sept. 19, 1949  3 Sheets-Sheet 1

Inventors
JOHN BRYAN SEED
GEORGE EDWARD CASSIE

Cushman, Darby & Cushman
Attorneys 2,714,832

ARTICLE SORTING AND DELIVERY MACHINE

John B. Seed, West Kilbride, and George E. Cassie, Ayr, Scotland, assignors to Imperial Chemical Industries Limited, a corporation of Great Britain Application September 19, 1949, Serial No. 116,592

Claims priority, application Great Britain October 4, 1948

3 Claims. (Cl. 86—45)

The present invention relates to a machine particularly adapted for delivering articles of relatively greater length than width and of substantially straight longitudinal axis, as for example, tubes, cylindrical rods.

The object of the present invention is to provide a machine of the aforesaid kind particularly adapted for delivering in an intermittent manner at least one row at a time of articles of relatively greater length than width and of substantially straight longitudinal axis with the longitudinal axes of the articles in any one row aligned substantially parallel to one another.

In the various steps of manufacture of for example cartridges of blasting explosives it is frequently important that the cartridges should be aligned parallel to each other in orderly fashion for example for waxing, mechanical felt sheathing, and packing. For example waxing of cartridges is performed mechanically more efficiently if the cartridges are fed to the waxing machine already aligned. Again packing into cartons is performed more expeditiously if the operators do not have to handle cartridges from a mixed heap.

According to the present invention the machine particularly adapted for delivering in an intermediate manner at least one row at a time of articles of relatively greater length than width and of substantially straight longitudinal axis with the longitudinal axes of the articles in any one row aligned substantially parallel to one another comprises in combination a hopper for receiving therein a bulk supply of said articles, said hopper having below an elongated opening wide enough to pass the said articles, means to prevent blocking of said elongated opening, a gravity chute below said elongated opening the inclined surface of which chute is provided with grooves running from top to bottom, said grooves being of a width to permit only one line of articles to lie therein and of a depth greater than the thickness of said articles, the distance between every other spacing between the grooves being greater and the distance between consecutive spacings being less than the length of the articles, pegs positioned at least in the top portion of said spacings, a sheet of material positioned so that it is lower than the lowest peg and so that at least its top end portion is below the height of the ridges forming the said grooves and of such thickness that its under surface is always distanced from the said slanting surface by a distance greater than the thickness of said articles, a stopping surface across the end of the grooves adapted to prevent the discharge of said articles from out of the grooves and lifting means positioned between said stopping means and the end of the grooves and below the bottom of the grooves adapted intermittently to rise and fall so as to lift successive rows of aligned articles over the said stopping means.

Preferably the means to prevent the blocking of said elongated opening comprises a system of co-acting bars across said elongated opening adapted to move vertically up and down through said opening and preferably through corresponding slots located in the opposite walls of said hopper which are on either side of the elongated opening. It is also desirable that while alternate bars are raised the remaining bars shall be down and vice versa. Again, it is also preferred that the distance between every other bar is greater and the distance between consecutive bars is less than the longitudinal lengths of the articles to be discharged. It is further preferred that while the co-acting bars are all positively lifted according to their groups the lowering of the bars either collectively or individually shall be due to gravity only. It is also desirable that the width of the elongated opening shall be adjustable.

Figure 2:
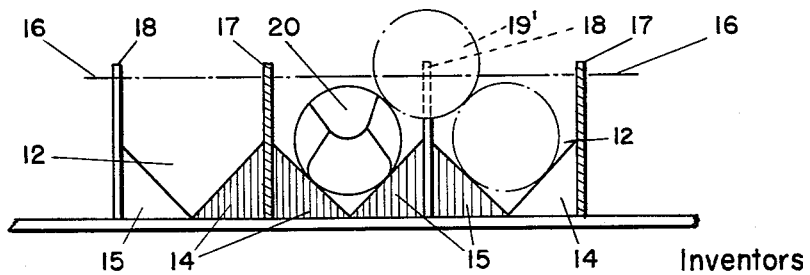
Figure 3:
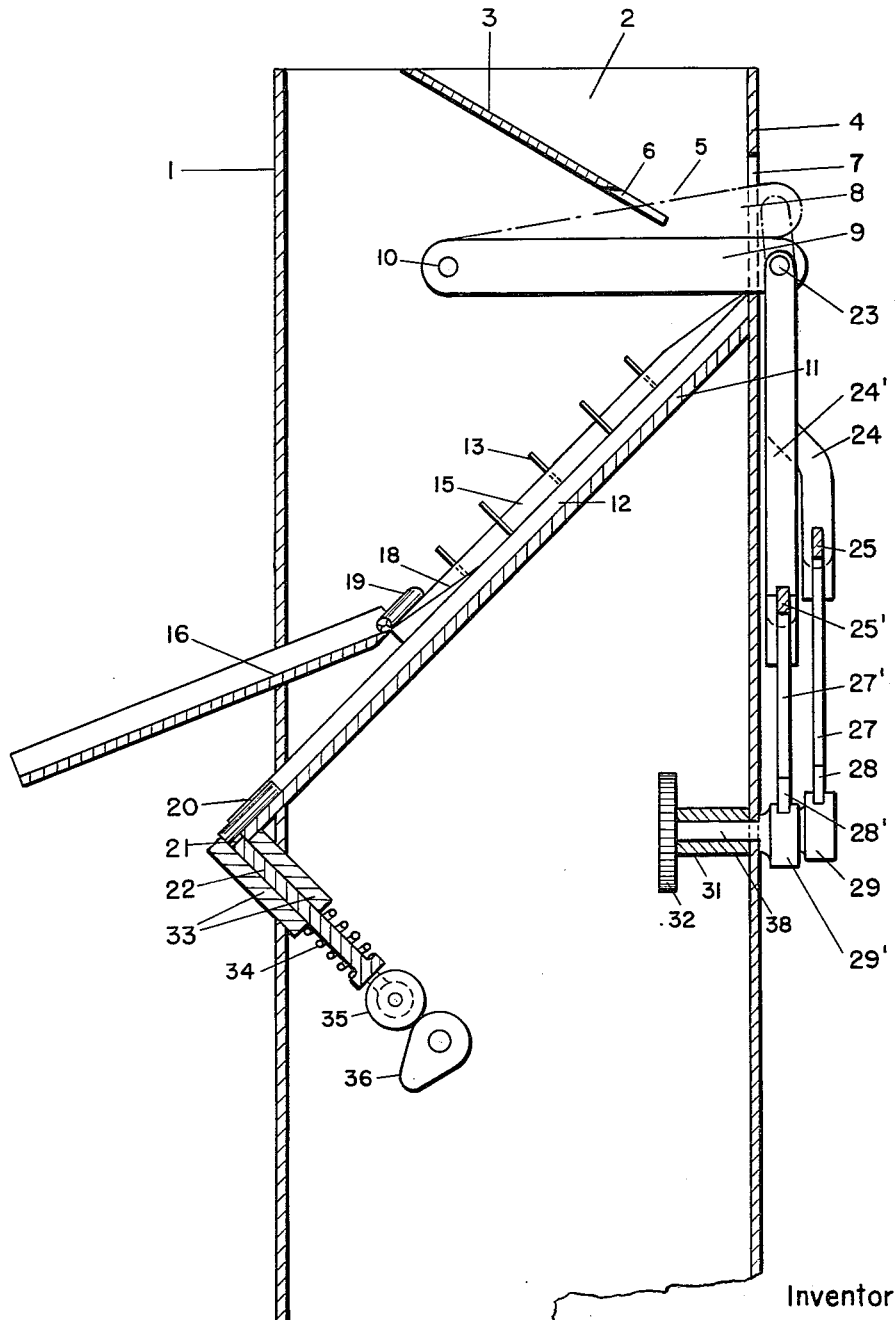
Figure 4:
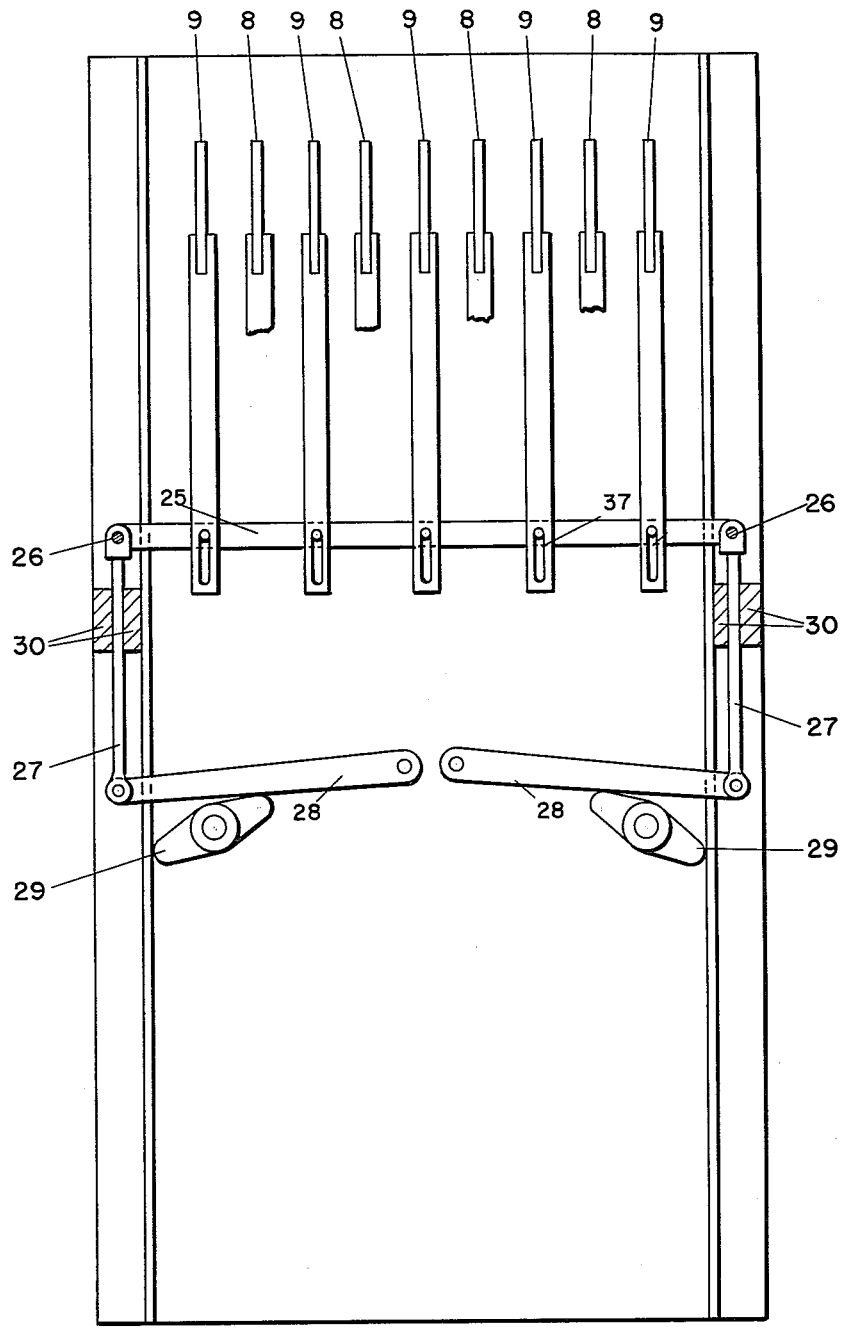

The invention is illustrated by way of example with reference to the alignment of cartridges of blasting explosives and to the diagrammatic drawings accompanying the specification whereof Fig. 1 is an isometric view, Fig. 2 is a sectional elevation of part of the machine on the line A—A of Fig. 1 looking in the direction of the arrows, Fig. 3 is a sectional end elevation, and Fig. 4 is a back elevation.

Referring to the drawings, 1 is the casing of the machine, 2 is the hopper into which cartridges are introduced, 3 is the front wall of the hopper 2, 4 is the back wall of the hopper 2, 5 is the elongated opening at the bottom of the hopper 2, running parallel to the back wall 4 of the hopper 2. 6 are the slotted openings at the bottom of the front hopper wall 3, and 7 are slots in the back wall 4. 8 are one set of slats and 9 are another set of slats. When the slats 8 are above the elongated opening 5 the slats 9 are below the elongated opening 5. The slats 8 and 9 are adapted to move up and down in the slots 6 and 7 of the front and back walls 3 and 4 respectively, being pivoted at 10, which is positioned below the front wall 3 of the hopper 2. The slats 8 and 9 are evenly spaced along the width of the hopper 2, and are so arranged that the distance between two adjacent slats of set 8 is greater than the length of cartridges to be handled. The slats of set 9 are similarly spaced, each one being midway between adjacent slats of set 8. In this way a cartridge cannot lie across two slats of one set, but will be lifted at one end, causing it to slip down between the slats to the gravity chute 11 below.

11 is the gravity chute with longitudinal grooves 12 on its surface, formed by the alternate ridge pieces 14 and 15. 17 are brass strips inserted in the apex of the alternate ridges 14, running the full length of the ridges down to the front sheet of material or "apron" 16. The remaining alternate ridges 15 have inserted in their apex shorter triangular pieces of brass 18, also abutting the top edge of the apron 16. The brass strips 17 in the alternate ridge pieces 14 carry a number of pegs 13, so spaced to form a pattern of five horizontal staggered rows. The purpose of the pins is to turn any cartridges not already aligned to the longitudinal grooves 12 and which are rolling down on top of the brass strips 17. There are no pins in the remaining alternate ridge pieces 15 which carry only the short triangular inset pieces of brass 18. The apron 16 is normally made of wood, but for convenience is shown transparent. The top edge of the apron 16, at which the brass strips 17 and the brass triangular pieces 18 terminate, is slightly below the top edge of these brass pieces. The last row of pegs 13 is arranged to be at a distance from this top edge of the apron 16 somewhat greater than the length of cartridges to be aligned.

19 is a cartridge which has failed to be aligned and has therefore not entered a groove 12, lying across a groove 12, with one end on top of a brass strip 17, and the other end on a triangular piece 18, and is about to roll on to the apron 16. Also if a cartridge 19' should enter the false groove formed by cartridges aligned in adjacent grooves 12 (Fig. 2) it slides down in contact with the correctly aligned cartridges, until it meets the triangular piece 18, which guides the cartridge in the false groove over the edge of the apron 16. All cartridges 19 and 19' which fail to enter a groove 12 are in this way removed and directed to a collecting container (not shown) and when a sufficient bulk of non-aligned cartridges have been collected, they are again sent into the hopper 2.

20 is a cartridge which is aligned in a groove 12, and is held at the lower end of the groove 12 by a stopping bar 21. 22 is a lifting or trip bar positioned below the level of the grooves 12, and adjacent to the stopping bar 21, being directly under the lower end of the cartridge 20 held by the stopping bar 21.

The lifting bar 22 is adapted intermittently to rise sharply to lift the end of the cartridges 20 over the stopping bar 21, and then to fall, allowing a further row of cartridges in the groove 12 to move down under gravity to the position of cartridges 20 and so on. The means required to raise and lower the lifting bar 21 is shown in Fig. 3 and not in Figs. 1, 2 and 4.

Referring specifically to Figs. 3 and 4 it will be seen that the alternate slats 9 are hinged by pins 23 to links 24. Each link is joined by means of a pin working in a slotted hole 37 to a horizontal bar 25 which at each end is joined by a link pin on to connecting rods 27, each of which is connected to a lever 28 which is acted on by one cam of a double cam 29, and which work in guides 30. Each double cam 29 is rotated by a shaft 38 working in a bearing 31 and driven by gear wheel 32. Thus while rotation of cam 29 causes positive lifting of either the set 8 or set 9 of slats, the lowering of such sets or individuals of such sets only occurs under gravity on account of the slotted holes 37. In this way crushing under power of the falling cartridges is prevented.

The remaining alternate slats 8 are connected by a similar system of levers to the other cam of the double cam 29. The two cams of the double cam 29 are so arranged that one set of slats 9 are raised to their highest position and lowered back down to their lowest position before the slats 8 commence thei rupward movement. The slats 8 likewise complete their upward travel, and return to their lowest position before slats 9 again commence to rise. The manner in which slats 8 are acted on by the double cams 29 is, for convenience, not shown in Fig. 4. Fig. 3, on the other hand, shows the links 24' and connecting rods 27' of the lever system for slats 8.

Referring specifically to Fig. 3 the lifting bar 22 is adapted to move between guides 33 and has springs 34 attached to hold it and the cam follower 35 in contact with the cam 36. When the cam 36 is rotated in one position it pushes the lifting bar 22 forward, and so the bar 22 is able to lift the end of the cartridges 20 over the stopping bar 21. At the same time the springs 34 are compressed and as the cam 36 rotates further the spring 34 pulls back the lifting bar 22, allowing the next row of cartridges 20 to slip down into contact with the stopping bar 21, with the lifting bar 22 positioned under the end of these cartridges, which are lifted over the stopping bar 21 in turn by the action of the cam 36 on the lifting bar 22.

If desired, an intermittently driven conveyor belt can be positioned, although this forms no part of the invention proper, in front of the stopping bar 21, at right angles to the grooves 12. The drive of the conveyor belt is so arranged that the belt stops when the lifting bar 22 rises. The conveyor belt is therefore stationary when the aligned cartridges 20 pass over the stopping bar 21. The desired intermittent motion can be given to the belt by means of a Geneva gear. Furthermore if desired the aligned cartridges on the conveyor can be carried along and delivered to a lifting conveyor having numerous slots and which is in steady motion. This lifting conveyor can for example carry the cartridges up to a convenient level for inspection and then discharge them on to a pair of parallel wooden guides where they can be examined for faults and then conveniently handled for packing into boxes or cartons.

We claim:

1. A machine adapted for delivering in an intermittent manner at least one row at a time of articles of relatively greater length than width and of substantially straight longitudinal axis, the longitudinal axes of the articles in any one row aligned substantially parallel to one another comprising a gravity chute for receiving a feed of said articles, the inclined surface of said chute being provided with a plurality of substantially parallel grooves running from top to bottom and separated by ridges therebetween, said grooves being of a width to permit only one line of articles to lie therein, the distance between the peak of every other ridge being greater and the distance between consecutive ridge peaks being less than the length of said articles, a reject apron positioned between the top and bottom ends of said chute with an edge thereof extending laterally across the ridges in said chute, every other ridge peak being provided with an upstanding alignment member extending from the top edge of said reject apron and terminating at a point adjacent the top of said gravity chute and each of the remaining intermediate ridge peaks being provided with a short upstanding article ramp member communicating with the top edge of said reject apron, the bottom surface of said apron being at a distance from the bottom of said grooves only slightly greater than the height of said articles.

2. A machine particularly adapted for delivering in an intermittent manner at least one row at a time of articles of relatively greater length than width as set forth in claim 1, wherein said upstanding alignment members extending from the top edge of said reject apron substantially to the top of said gravity chute are provided with a plurality of upstanding spaced apart deflector pins of a height greater than said alignment members.

3. A machine particularly adapted for delivering in an intermittent manner at least one row at a time of articles of relatively greater length than width as set forth in claim 1, wherein there is provided across the lower ends of the grooves a stopping surface adapted to prevent the discharge of said articles from out of the grooves and lifting means positioned between said stopping means and the end of the grooves and below the bottom of the grooves adapted intermittently to rise and fall so as to lift successive rows of aligned articles over the said stopping means.

References Cited in the file of this patent

UNITED STATES PATENTS

| | | |
|---|---|---|
| 289,360 | Sullivan | Nov. 27, 1883 |
| 952,477 | Stillwell | Mar. 22, 1910 |
| 1,495,610 | Paridon | May 27, 1924 |
| 1,513,007 | Remington | Oct. 28, 1924 |
| 1,607,932 | Whitmore et al. | Nov. 23, 1926 |
| 1,632,852 | Richter | June 21, 1927 |
| 1,972,488 | Kimball et al. | Sept. 4, 1934 |
| 2,428,103 | Vergobbi | Sept. 30, 1947 |
| 2,456,031 | Spain | Dec. 14, 1948 |